US010618763B2

(12) United States Patent
Kirchhoff et al.

(10) Patent No.: US 10,618,763 B2
(45) Date of Patent: Apr. 14, 2020

(54) METHOD FOR ADAPTING AT LEAST ONE WINDING PARAMETER OF A WINDING DEVICE

(71) Applicant: Windmöller & Hölscher KG, Lengerich (DE)

(72) Inventors: Tim Kirchhoff, Münster (DE); Frank Hoffmann, Greven (DE); Martin Backmann, Lengerich (DE)

(73) Assignee: Windmöller & Hölscher KG, Lengerich (DE)

( * ) Notice: Subject to any disclaimer, the term of this patent is extended or adjusted under 35 U.S.C. 154(b) by 310 days.

(21) Appl. No.: 15/626,620

(22) Filed: Jun. 19, 2017

(65) Prior Publication Data

US 2017/0283201 A1 Oct. 5, 2017

Related U.S. Application Data

(63) Continuation of application No. PCT/EP2015/079392, filed on Dec. 11, 2015.

(30) Foreign Application Priority Data

Dec. 19, 2014 (DE) ........................ 10 2014 119 204

(51) Int. Cl.
*B65H 18/26* (2006.01)
*B29C 55/06* (2006.01)
(Continued)

(52) U.S. Cl.
CPC ............. *B65H 18/26* (2013.01); *B29C 55/06* (2013.01); *B65H 18/021* (2013.01);
(Continued)

(58) Field of Classification Search
CPC .. B65H 18/26; B65H 23/1806; B65H 23/063; B65H 23/044; B65H 18/021; B29C 55/06; B29C 53/56
See application file for complete search history.

(56) References Cited

U.S. PATENT DOCUMENTS 3,674,221 A * 7/1972 Riemersma ........ B65H 23/1888
242/412.2
2006/0037389 A1* 2/2006 Jorkama .................. G01N 3/08
73/159
(Continued)

FOREIGN PATENT DOCUMENTS

DE 10392814 5/2005
DE 202008011131 11/2008
GB 890005 2/1962

OTHER PUBLICATIONS

German Patent Application No. 102014119204.4 filed Dec. 19, 2014 in the name of Windmöller & Hölscher KG, Office Action dated Aug. 10, 2015.
(Continued)

*Primary Examiner* — William A. Rivera
(74) *Attorney, Agent, or Firm* — Levine Bagade Han LLP

(57) ABSTRACT

The invention relates to a method for adapting at least one winding parameter of a winding device during winding of a film web on a winding core, having the following steps: —conveying of the film web along a measuring path between a first driven roll and a second driven roll—increasing of the web tension of the film web between the first roll and the second roll—continuous detecting of the drive parameters of the first roll and of the second roll at least in the form of the torque and the circumferential speed, —determining of a stress-strain diagram from the detected drive parameters—adapting of at least one winding parameter of the winding device on the basis of the determined stress-strain diagram in order to achieve a defined elongation of the film web during winding on the winding core.

15 Claims, 5 Drawing Sheets

(51) Int. Cl.
  *B65H 18/02*  (2006.01)
  *B65H 23/04*  (2006.01)
  *B65H 23/06*  (2006.01)
  *B65H 23/18*  (2006.01)
  *B29C 53/56*  (2006.01)

(52) U.S. Cl.
  CPC ......... *B65H 23/044* (2013.01); *B65H 23/063* (2013.01); *B65H 23/1806* (2013.01); *B29C 53/56* (2013.01)

(56) References Cited

U.S. PATENT DOCUMENTS

2008/0185473 A1\* 8/2008 Michal ................ B65H 23/195
                                                                    242/410
2009/0195877 A1    8/2009 Nakai
2017/0267480 A1\* 9/2017 Sakamoto .............. B65H 23/18

OTHER PUBLICATIONS

PCT International Patent Application No. PCT/EP2015/079392 filed Dec. 11, 2015 in the name of Windmöller & Hölscher KG, International Search Report and Written Opinion dated Apr. 7, 2016.

\* cited by examiner

METHOD FOR ADAPTING AT LEAST ONE WINDING PARAMETER OF A WINDING DEVICE

CROSS-REFERENCE TO RELATED APPLICATIONS

This application is a continuation of International Patent Application No. PCT/EP2015/079392, filed Dec. 11, 2015 which claims benefit of German Patent Application No. 102014119204.4, filed Dec. 19, 2014, the content of each of which is incorporated herein by reference in its entirety.

BACKGROUND

The present invention refers to a method for adapting at least one winding parameter of a winding device during winding of a film web on a winding core as well as to an optimization device for performing such an adaptation.

It is known that in film producing machines endless film webs are generated. These film webs are then wound on winding cores, in order to allow their handling during storage and transportation. These winding cores are often made of plastics, steel or cardboard. In order to wind the film web over the winding core, several quality parameters have to be observed. In particular it has to be ensured that the winding on the winding core is neither too tight nor too loose. A too-tight winding would possibly cause a collapse of the winding core or damage to the film web due to plastic deformation of the same. A too-loosely wound web may cause a lack of stability during web winding, for instance through telescoping of the web roll. To this end, it is known to perform an adaptation of winding parameters, which adapts the individual control parameters of the winding device to the type of film. The type of film is tested and determined in the lab and based on the obtained information, the winding parameters are set. Moreover, the operators of the machine have values based on experience at their disposal, which may be used as a basis for the setting of the winding parameters. However, these two solutions require a lot of time, and on the other hand they rely on extensive experience of the operators. Moreover, despite good experience by the operators and detailed measurements in the laboratory, errors are still possible, since no information about actual conditions and their effects on the film web in the winding situation in the winding device is available.

SUMMARY OF THE INVENTION

The object of the present invention is to at least partially eliminate the above-said drawbacks. In particular, the object of the present invention is to improve, in a cost-effective and simple way, the optimization of the winding parameters during winding of a film web on a winding core.

The above-said object is achieved by a method for adapting at least one winding parameter of a winding device according to claim 1 as well as an optimization device with the characteristics of claim 11. Further characteristics and details of the invention are contained in the dependent claims, in the description and in the drawings. In particular, characteristics and details, which are described with reference to the inventive method, are obviously also valid with reference to the inventive optimization device and vice versa, so that, regarding the disclosure, reference is or can always be reciprocally made to the individual aspects of the invention.

A method according to the invention is used for adapting at least one winding parameter of a winding device during winding of a film web on a winding core. To this end, a method according to the invention comprises the following steps:

conveying of the film web along a measuring path between a first driven roll and a second driven roll, increasing of the web tension of the film web between the first roll and the second roll, continuous detecting of the drive parameters of the first roll and of the second roll at least in the form of the torque and the circumferential speed, determining of a stress-strain diagram from the detected drive parameters, adapting of at least one winding parameter of the winding device on the basis of the determined stress-strain diagram in order to achieve a defined elongation of the film web during winding on the winding core.

A method according to the invention now entails that the material parameters of the film web are deduced in the winding device and during the winding or within the same winding device or the film producing machine. Contrary to the previous solution, where the determination is performed in a separate lab or the setting is performed on the basis of experimental values, according to the invention, during the winding or prior to the winding a corresponding inventive determination is performed. To this end a measuring path is now set, which is defined by two driven rolls. Each of these driven rolls drivingly contacts the film web. Obviously, each of both rolls may be complemented by a secondary roll, so that a first roll with a first secondary roll from both sides provides a conveying of the film web. The same holds for a second roll with a second secondary roll.

It is also possible that film characteristic values, in particular the tension-elongation diagram, are provided to the product, directly or indirectly for a following further processing. This can be performed, for example, by means of a QR code on the product or as parametric data in an commissioning management system.

A web tension in the sense of the present invention is the force, in particular along or essentially along the conveying direction of the film web. If, therefore, the film web is conveyed along the measuring path from the first to the second roll, a driving force is transmitted to the film web on both rolls. This transmission of force takes place through frictional contact between the film web and the surface of the respective roll. According to the driving speed, as a function of the geometric form of the respective roll, a corresponding circumferential or circumferential speed of this roll is set. The circumferential speed corresponds to the conveying speed of the film web in this position. Usually, by passing through a film machine or a winding device, a defined web tension is provided, in order to hold the film web with utmost certainty always at this tension. This means that the circumferential speed increases from roll to roll, in order to keep this tension. Between the first and the second roll, according to the invention, this web tension is increased. This increase may in particular comprise a modification of the relation between the circumferential speed of the first roll with respect to the circumferential speed of the second roll. In this way, the force which is introduced along the measuring path into the film web is modified, i.e. increased by increasing the web tension. In other words, a greater tensile force is applied on the film web due to this step.

The increased force in the film web introduced by the higher web tension causes a modification of the elastic or plastic elongation of the film web along the measuring path.

In this way a feedback on the required torques is possible, which is necessary in order to achieve the respective circumferential speed setting. If, for example, a higher force is required, in order to set the desired high web tension, for the high required circumferential speed, a correspondingly high torque is required. If the film web is made of a soft and therefore easily stretchable material, for the same circumferential speed, only a reduced torque is required, in order to set and keep such an increased web tension.

As will be appreciated from above dissertation, the necessary torque required for achieving the set circumferential speed depends on the mechanical properties of the film web. Therefore, in particular, through the continuous or step-wise increase of the web tension and of the correlated continuous detection of the drive parameters, it is possible to determine a stress-strain diagram from these detected drive parameters, which is specific for the film web inside the film machine. With this stress-strain diagram, which may be considered as the film parameter of the film web, it is now possible to provide the final inventive step, i.e. the adapting at least of one winding parameter. This adapting is targeted, in that a defined elongation of the film web is achieved during the winding on the winding core. In this way, in particular for the winding steps, the web tension is set as a winding parameter, which for example may be varied by varying the winding parameter of the rotational speed of a winding core or of a corresponding contact roll.

Therefore, an inline measurement is also possible, which allows to obtain, for different film qualities, and different film load capacities, the same or essentially the same winding quality. If, in the stress-strain diagram, the film web is defined as a relatively soft material, a different winding parameter will be required for the desired elongation, which in particular still lies in the elastic range, with respect to the case, where the film web is a relatively stable and resistant material.

Obviously, beside the torque and the circumferential speed, other drive parameters of rolls may be detected, in order to allow for a still more precise adaptation of the winding parameters. Separate parameters, like the winding pressure, which is explained in the following, may be detected in the context of the present invention.

A method according to the invention also allows the performing, in the specific operating situation and therefore with minimal errors, and above all with no time delay, the measurement and adaptation of the winding parameters. Real environmental parameters and other influences on the film web in this operating situation are therefore automatically taken into account during the detection steps.

It may be advantageous if in an inventive method, the web tension along the measuring path is generated by accelerating the second roll and/or braking or decelerating the first roll. It may be an acceleration as well as a deceleration as well as a combination of acceleration and deceleration. It is important that in order to increase the web tension along the measuring path, the difference of the circumferential speed between both rolls is varied. It is to be noted that both rolls may obviously have a different diameter. Therefore, not only the rotational speed, i.e. the rounds per minute of the respective roll, is decisive, but the correlation to the diameter and the circumferential speed which is set in accordance with the set rotational speed. The braking of the first roll combined with an acceleration of the second roll pushes the differences of circumferential speed to a maximum, which is advantageous, in particular with a high-elasticity film web, in order to provide a complete stress-strain diagram. According to the invention it is ensured that the web tension's increase is stopped in time, in order to avoid a rupture of the film web. Whereas in lab measurements usually a measurement piece of a film web is tested up to the breaking point, a method according to the invention within the device proceeds only up to a certain degree. It may for example be imposed that the web tension is increased until the limit between elastic and plastic behavior is recognized. It is also possible to exceed said limit by 10%, in order to exactly define the transition point between the elastic and plastic behavior.

It is also advantageous if in an inventive method the first roll and/or the second roll are at least one of the following driving rolls of the winding device or of a film machine:
cutting feed roll
contact roll
central drive roll
stretching roll
support roll.

This list is not exhaustive. Decisive for the inventive correlation is the fact that the second roll is positioned after the first roll. It may be preferable, if inside the measuring path, i.e. the entire movement path between the first and second roll, the film web has no contact to a further roll and/or another guiding surface or guiding device. However, it is also conceivable that the measuring path is provided with one or more deflecting rolls, in particular passive rolls, i.e. not driven, in order to provide a longer but more compact measuring path.

A further advantage may consist in the fact that, in a method of the invention, as a winding parameter at least one of the following is adapted:
web tension of winding core
roll overfeed of winding device
pressing forces of film web on winding core This list is not exhaustive. The web tension of the winding core particularly correlates to the winding hardness, i.e. the force with which the single layers of the film web in a film roll are wound around the winding core. The roll overfeed of the winding device provides a measure of how it can influence or set this web tension. The pressing forces of the film web on the winding core are also directly correlated to the web tension and may additionally, for example through a corresponding contact roll, be provided in a defined way. The goal is always the setting of a defined elongation, in particular in the elastic zone in proximity of the plasticity limit of the film web.

A further advantage may be obtained if in a method according to the invention, the film web wraps around the first roll and/or the second roll at least during the performing of the method over an angle of more than about 90°, in particular between about 100° and 180°. This is the so-called wrapping angle of the respective roll. The wider the wrapping, the higher the traction between the surface of the roll and the conveyed film web. A higher traction and the correspondingly set higher adhesion friction between the film web and the respective roll implies a reduced risk of slipping of the drive. In particular, in case of high web tensions inside the film web, large forces are generated through the corresponding inner material forces in the film web, which transfer to the surfaces of both rolls. It is therefore possible to provide also high web tensions, without a slipping causing an undesired limitation of the web tension. It is also advantageous if both rolls have a corresponding friction-improved, friction-enhanced or similarly adapted surface, in order to further improve tractions.

A further advantage may consist in that in a method of the invention, the winding of the film web takes place at least during the detection of the drive parameters on a test core, which has a sensor device for detecting the winding pressure acting upon the test core. In this case, during adaptation of the at least one winding parameter, an upper limit of the winding pressure is additionally taken into account. The test core may be part of the normal winding core. It is also possible to provide a separate test core with such a sensor device. The winding pressure is in particular a pressing force, which is radially directed or essentially radially directed to the rotational axis of this test core. This winding pressure is caused by the tension during the winding of the film web and increases with an increase in the web tension in the film web during this winding process. The higher the winding pressure is set, the higher the strength of the winding core must be. This winding pressure may be used in order to set the winding parameter by selecting a correspondingly more stable winding core for the winding process. In case of light winding core, especially made of cardboard, an upper limit may defined, which has to be taken additionally into account in adapting the winding parameter. This upper limit is set by providing a security zone for maximum load capacity regarding the winding pressure of the actual winding core in use.

A further advantage is achieved if in an inventive method, the winding pressure is used for compensation with a winding model, in order to use, verify and/or optimize this winding model for adapting the at least one winding parameter. A winding model also considers the mechanical properties of the film web. The correlation between the winding parameters and the determined stress-strain diagram in particular is a basis present in the winding model. Different winding models may therefore lead to different results in the adapting of the winding parameters. Through the determined winding pressure it may for instance be possible to select an explicit winding model to be used, or the selected winding model may be verified regarding its correctness. Existing winding models may also be modified or optimized as a feedback through the winding pressure.

It is also advantageous if in an inventive method the transmission of the detected winding pressure to a control unit is performed wirelessly, in particular based on the following standards:

W-LAN (Wireless Local Area Network)
Bluetooth
NFC (Near Field Communication)

The previous list is not exhaustive. A wireless communication reduces the complexity of the communication, in particular regarding its construction, since cabling is reduced or eliminated. The sensor device may also be provided as a cost-effective solution as a co-rotating part of the winding core.

A further advantage is the fact that in an inventive method, before reaching the first roll, a measuring strip is cut, in particularly continuously, from the film web, and the measuring strip runs along the measuring path. In this way only a part of the film web is verified with respect to the inventive method. It is possible, for example, that the film web is cut on a film machine. Such a cutting is in particular performed on the edges or centrally, in order to obtain correspondingly reduced widths of the film web for the following winding device or the following winding devices. These so-called bad webs, which are cut away, and which may also be defined as trims, are led away and either disposed of or led to a recycling process. In such cases the measuring strip is a waste product for use in an inventive method. In this case, preferably, a central measuring strip is used, in order to approximate as much as possible the real quality of the product. In the following path of this measuring strip a measuring path may be provided, which performs the inventive method exclusively on these measuring strips. It is therefore possible to continuously perform inline the inventive method or repeat the same in a continuous and/or regular way, whereby the inventive advantages of a regular monitoring of the applied winding parameters may be provided.

It is also advantageous if, in an inventive method, the steps are regularly and/or continuously repeated. This, in particular in combination with the previous paragraph, entails that for the entire operating period a high security and winding quality may be guaranteed in a continuous way. For example, the inventive detection steps may be performed at defined time intervals. Also, a continuous or almost continuous measurement according to the invention is feasible. It may also be envisaged that the predetermined film parameters are stored and analyzed. This may be achieved for example by comparing with preset values. Also, the issuing of a warning signal based on such a comparison may be envisaged.

Another object of the present invention is an optimization device for adapting at least one winding parameter of a winding device during winding of a film web on a winding core. Such an optimization device has a first and a second roll for conveying the film web along a measuring path between these two rolls. Moreover, a control unit is provided for performing the following steps:

increasing the web tension of the film web between the first roll and the second roll,
continuous detecting of the drive parameters of the first roll and of the second roll, at least in the form of the torque and circumferential speed,
determining of a stress-strain diagram from the detected drive parameters,
adapting of at least one winding parameter of the winding device on the basis of the determined stress-strain diagram in order to achieve a defined elongation of the film web during winding on the winding core.

In particular, drive devices for the individual rolls, a detection device for detecting the drive parameters as well as the control unit for determining the stress-strain diagrams and adapting the winding parameters are provided.

An optimization device according to the invention is preferably configured in that the control unit is arranged for performing an inventive method. The optimization device of the invention entails the same advantages, which have been explained with reference to the inventive method.

It may be advantageous, if in an optimization device according to the invention, the wrapping angle of the first roll and/or the wrapping angle of the second roll are greater than about 90°, in particular between about 100° and 180°. In this way the same advantages regarding a better traction are achieved as in the case described with reference to the corresponding step of said method.

It is also advantageous if in an optimization device of the invention, the wrapping angle of the first roll corresponds or essentially corresponds to the wrapping angle of the second roll. This is in particular combined with dimensional relationships according to the preceding paragraph. If the wrapping angle for both rolls is selected as to be essentially identical or exactly identical, an identical or an essentially identical friction condition is created for both rolls, in particular having the same diameter. Also in this case, due to the corresponding force compensation between both rolls, the traction condition is improved and a slip through is avoided with high certainty.

It is also advantageous if, in an optimization device according to the present invention, a test core for winding the film web is provided, which test core has a sensor device for detecting the winding pressure acting upon the test core. Also in this case the corresponding advantages have already been explained with reference to the corresponding step of said method. The sensor device is particularly configured for a radio transmission. Also in this case the already described compensation with a winding model may be provided. In such a test core a circumferential slit may be provided, for example, at least partially, along the longitudinal extension, in which the sensor device is housed. A pressure sensor may also be provided, according to the present invention, on the surface of the test core.

BRIEF DESCRIPTION OF THE DRAWINGS

Further advantages, characteristics and details of the invention will become apparent from the following description, in which, with reference to the drawings, exemplary embodiments of the invention are explained in detail. The characteristics, which are cited in the claims and in the description, may be considered essential for the invention per se or in any suitable combination. In particular, schematically:

DETAILED DESCRIPTION

Figure 2:
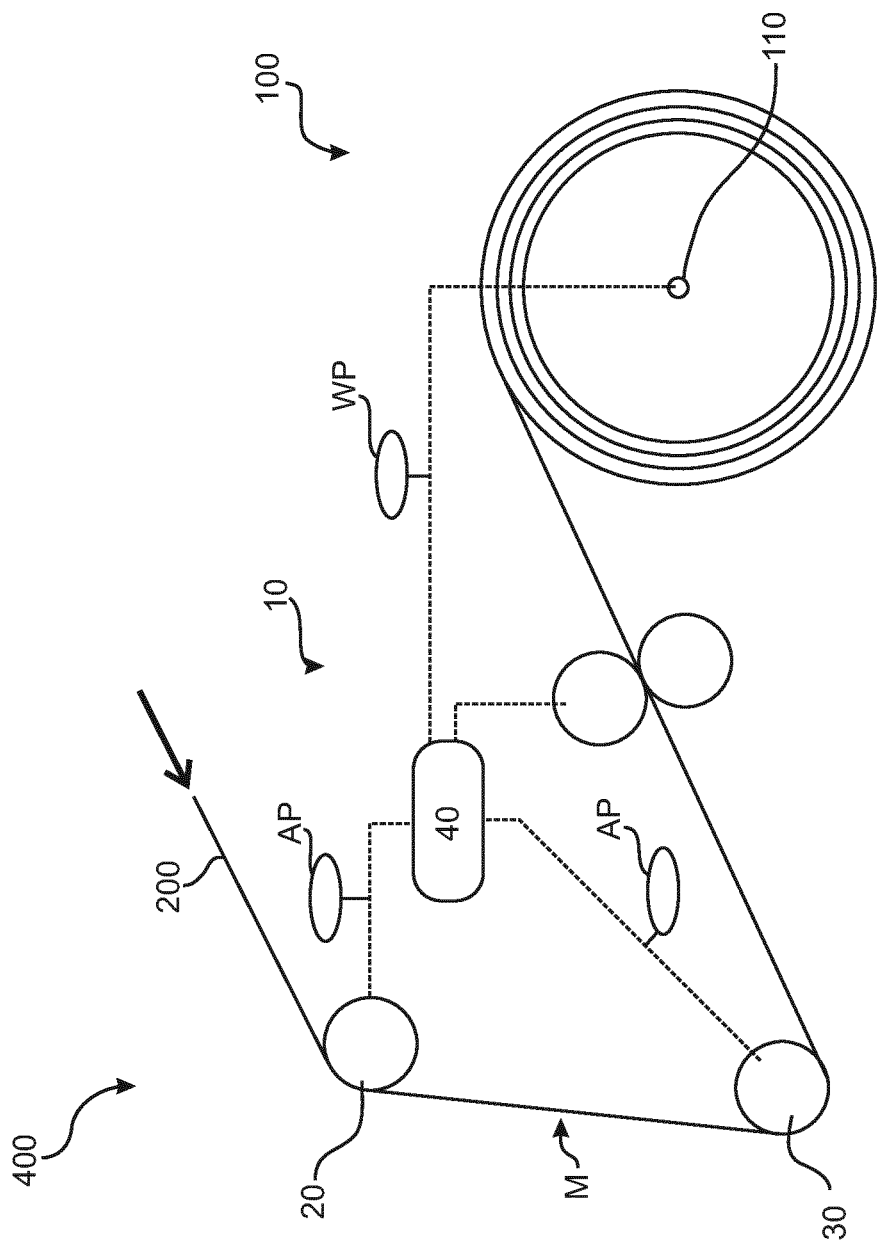
FIG. 2 shows a further possible embodiment of an inventive method with an optimization device.

The simplest embodiment of an inventive optimization device 10 is shown in FIG. 2. Here, a winding device 100 with a winding core 110 is provided, on which a film web 200 is wound. The film web 200 comes from a film machine 400 and is deflected inside about various rolls. In this case a first roll 20 and a second roll 30 are explicitly shown, wherein a measuring path M for the film web 200 is provided in-between. According to the invention, this measuring path M may be used to increase, by corresponding modification of the drive condition, a web tension in the film web 200 in the measuring path M, as explained in the following.

A control unit 40 of the optimization device 10 is connected, by communicating signals, with both driven rolls 20 and 30, and determines there continuously the corresponding drive parameters AP, which are the torque and the circumferential speed and optionally further additional drive parameters AP. Moreover, in a control device 40, the inventive method is executed, i.e. in particular, the stress-strain diagram is determined and then, for achieving a defined elongation, at least one winding parameter WP is adapted. The adaptation may here, for example, result in a variation of the rotational speed of the winding device 100.

Figure 1:
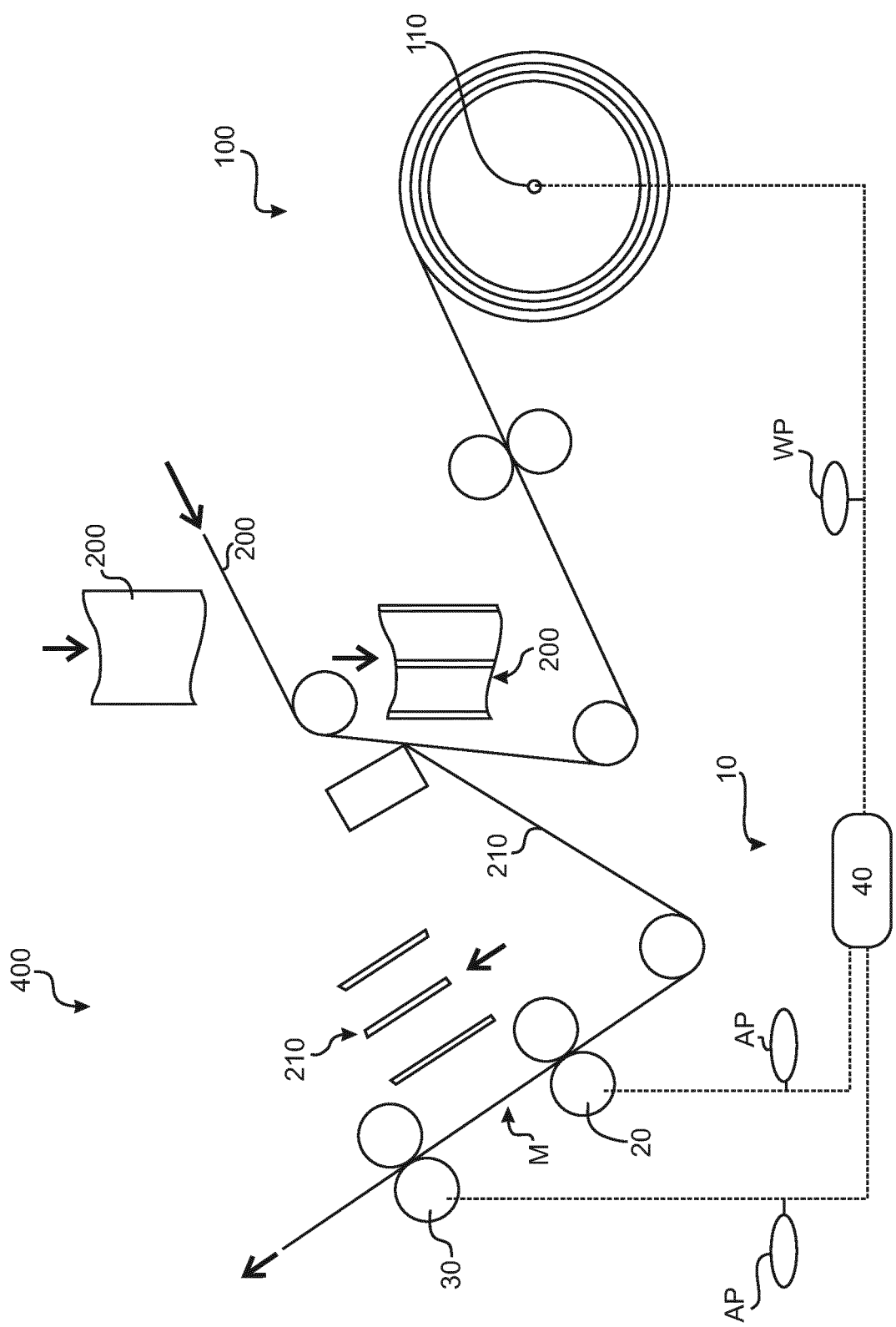
FIG. 1 shows an illustration of an inventive method with a corresponding optimization device.

FIG. 1 shows an elaboration of FIG. 2. In this case, the film web 200 is contacted by a cutting device, which performs a cutting or a plurality of cuttings after a roll. An entire film web 200 is represented coming from the upper right side along the direction of the arrow. A corresponding cutting device cuts measuring strips 200, in this case three pieces, and separates these from the rest of the film web 200. While the rest of the film web 200 is wound around the already described roll of FIG. 2, the measuring strips 210 are conveyed to the left. Here, one or more of these measuring strips 210 may also run along a measuring path M between two rolls 20 and 30. Here, also, a variation of the web tension and the same detection of drive parameters AP takes place by the control unit 40. Here, also, a stress-strain diagram is determined and correspondingly at least one of the winding parameters WP is adapted.

Figure 3:
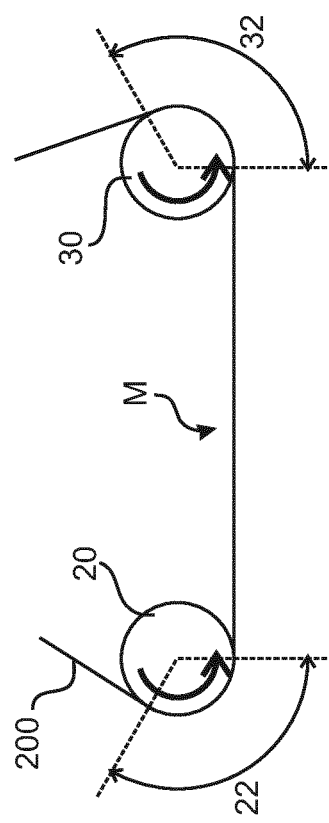
FIG. 3 shows a possible increase of the web tension.
Figure 4:
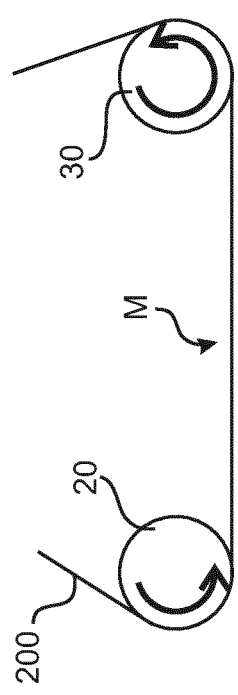
FIG. 4 shows a further possible increase of web tension.
Figure 5:
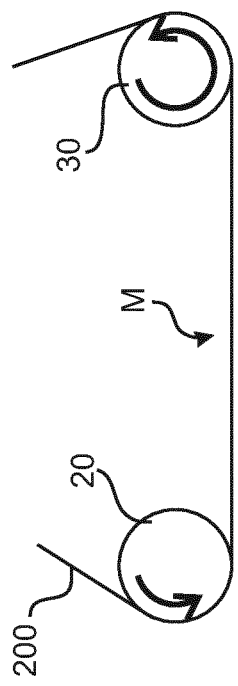
FIG. 5 shows a further possible increase of web tension.

FIGS. 3 to 5 show possibilities and definitions of the web tension of the film web 200. Here, both rolls 20 and 30 are provided with wrapping angles 22 and 32>90°. Both wrapping angles 22 and 32 are essentially identical in this case. The film web 200 runs along the measuring path M, wherein in FIG. 3, web tension is absent or very low, since the circumferential speed of both rolls 20 and 30 is identical or essentially identical. As shown by the increase or reduction of rotation arrows in FIGS. 4 and 5, a change of circumferential speed now takes place. According to FIG. 4, the circumferential speed of second roll 30 is increased, whereby the web tension in the film web 200 increases along the measuring path M. Thereafter, or as an alternative, a braking and therefore a reduction of the circumferential speed of the first roll 20 of FIG. 5 has taken place, which leads to a further increase of the web tension in the film web 200.

Figure 6:
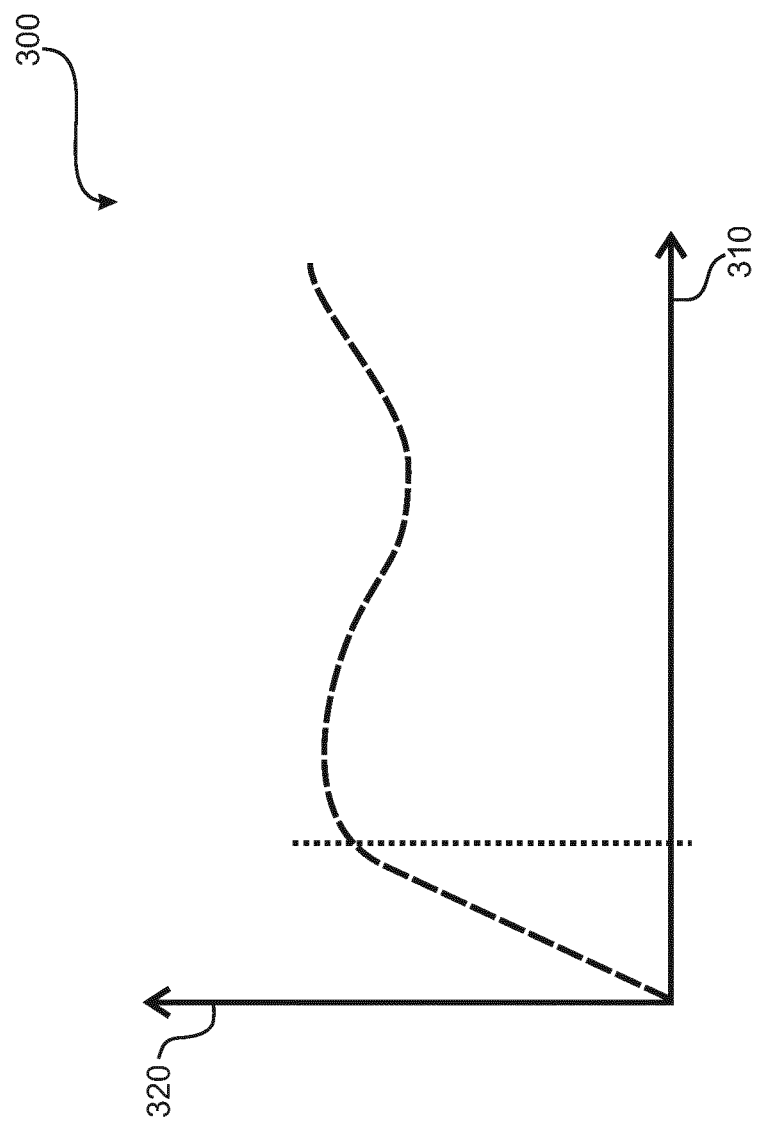
FIG. 6 shows an example of a stress-strain diagram.

Through continuous monitoring of the drive parameters AP, i.e. torque and circumferential speed of both rolls 20 and 30, the control unit 40 may determine a stress-strain diagram 300 according to FIG. 6. In this case, the vertical dotted line clearly shows the transition between an elastic behavior and a plastic behavior for the measuring result. Here a defined value is set along the elongation 310, which corresponds to a corresponding tension 320, and this defined elongation has to be achieved. To this end, the control unit 40 adapts at least one winding parameter WP, for example the web tension or the circumferential speed of the winding core 110.

Figure 8:
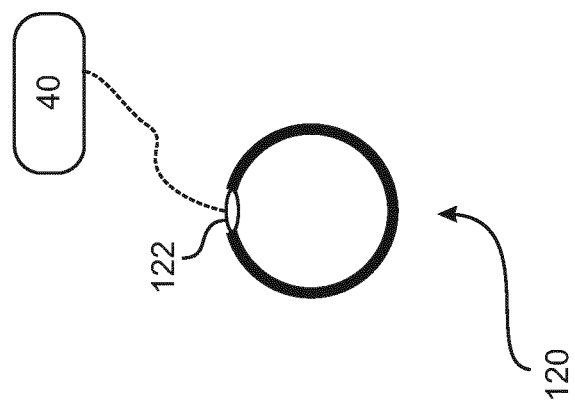
FIG. 7 shows an embodiment of a test core and
FIG. 8 shows a further embodiment of a test core.
Figure 7:
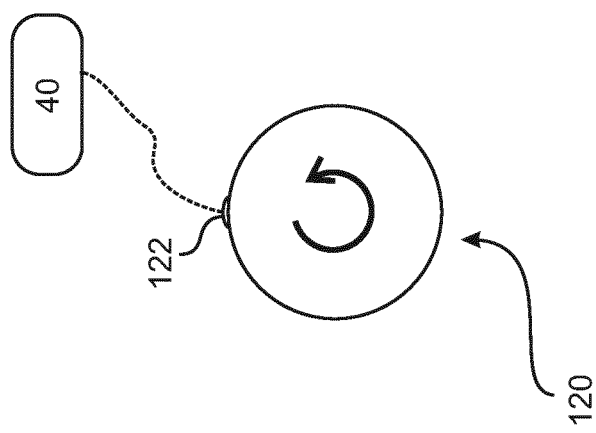

FIGS. 7 and 8 show different solutions for the test cores 120, which are here both provided with sensor devices 122. According to the embodiment of FIG. 7, the sensor device 122 is a pressure sensor, positioned on the surface of the test core 102. According to FIG. 8, a corresponding sensor device 122 is positioned in a longitudinal slit of the hollow test core 120. In both cases, the communication with the control unit 40, shown by a dotted line, takes place by wireless transmission, in particular by means of a Wi-Fi or Bluetooth module.

The preceding explanation of embodiments describes the present invention exclusively in the context of examples. It is apparent that individual characteristics of these embodiments, as long as they are technically feasible, may be freely combined with each other, without departing from the scope of the present invention.

REFERENCE LIST 10 optimization device
20 first roll
22 wrapping angle
30 second roll
32 wrapping angle
40 control unit
100 winding device
110 winding core
120 test core
122 sensor device 200 film web
210 measuring strip
300 stress-strain diagram
310 elongation
320 tension
400 film machine
AP drive parameters
WP winding parameters
M measuring path

We claim:

1. A method for adapting at least one winding parameter of a winding device during winding of a film web on a winding core, the method comprising:
    conveying of the film web along a measuring path between a first driven roll and a second driven roll;
    increasing of the web tension of the film web between the first roll and the second roll;
    continuous detecting of the drive parameters of the first roll and of the second roll at least in the form of the torque and the circumferential speed;
    determining of a stress-strain diagram from the detected drive parameters;
    adapting of at least one winding parameter of the winding device on the basis of the determined stress-strain diagram in order to achieve a defined elongation of the film web during winding on the winding core.

2. The method of claim 1, wherein the web tension is generated along the measuring path by accelerating the second roll and/or braking the first roll.

3. The method of claim 1, wherein the first roll and/or second roll are at least one of the following drive rolls of the winding device or of a film producing machine: a cutting feed roll, a contact roll, a central drive roll, a stretching roll, and a support roll.

4. The method of claim 1, wherein at least one of the following winding parameters is at least one of web tension to the winding core, roll overfeed of winding device, and pressing forces of film web on winding core.

5. The method of claim 1, wherein the film web wraps around the first roll and/or the second roll at least during the performing of the method over an angle of more than about 90°, in particular between about 100° and 180°.

6. The method of claim 1, further comprising continuously cutting a measuring strip from the film web before reaching the first roll, and wherein the measuring strip passes through the measuring path.

7. An optimization device for adapting at least one winding parameter of a winding device during winding of a film web on a winding core, having a first roll and a second roll for conveying the film web along a measuring path between these two rolls, further provided with a control unit for:
    increasing the web tension of the film web between the first roll and the second roll;
    continuous detecting of the drive parameters of the first roll and of the second roll, at least in the form of the torque and circumferential speed;
    determining of a stress-strain diagram from the detected drive parameters; and
    adapting of at least one winding parameter of the winding device on the basis of the determined stress-strain diagram in order to achieve a defined elongation of the film web during winding on the winding core.

8. The optimization device of claim 7, wherein the control unit is configured for:
    conveying of the film web along a measuring path between a first driven roll and a second driven roll;
    increasing of the web tension of the film web between the first roll and the second roll;
    continuous detecting of the drive parameters of the first roll and of the second roll at least in the form of the torque and the circumferential speed;
    determining of a stress-strain diagram from the detected drive parameters;
    adapting of at least one winding parameter of the winding device on the basis of the determined stress-strain diagram in order to achieve a defined elongation of the film web during winding on the winding core.

9. The optimization device of claim 7, wherein the wrapping angle of the first roll and/or the wrapping angle of the second roll is greater than 90°.

10. The optimization device of claim 9, wherein the wrapping angle of the first roll and/or the wrapping angle of the second roll is between about 100° and 180°.

11. The optimization device of claim 7, wherein the wrapping angle of first roll at least corresponds to the wrapping angle of the second roll.

12. The optimization device of claim 7, further comprising a test core for winding the film web, wherein the test core comprises a sensor device for detecting the winding pressure acting upon the test core.

13. A method for adapting at least one winding parameter of a winding device during winding of a film web on a winding core, the method comprising:
    conveying of the film web along a measuring path between a first driven roll and a second driven roll;
    increasing of the web tension of the film web between the first roll and the second roll;
    continuous detecting of the drive parameters of the first roll and of the second roll at least in the form of the torque and the circumferential speed;
    determining of a stress-strain diagram from the detected drive parameters;
    adapting of at least one winding parameter of the winding device on the basis of the determined stress-strain diagram in order to achieve a defined elongation of the film web during winding on the winding core,
    wherein the winding of the film web takes place at least during the detection of the drive parameters on a test core, which has a sensor device for detecting the winding pressure acting upon the test core, wherein the adaptation of the at least one winding parameter additionally considers an upper limit for the winding pressure.

14. The method of claim 13, wherein the winding pressure is used for compensation with a winding model, in order to use, verify and/or optimize this winding model for adapting the at least one winding parameter.

15. The method of claim 13, wherein the transmission of the detected winding pressure to a control unit is executed wirelessly according to at least one of the following standards: W-LAN (Wireless Local Area Network), Bluetooth, and NFC (Near Field Communication).

* * * * *